Patented Aug. 15, 1939

2,169,578

UNITED STATES PATENT OFFICE 2,169,578

HIGHER ALKOXYACETONITRILES

Herman A. Bruson and Rush F. McCleary, Philadelphia, Pa., assignors to The Resinous Products & Chemical Company, Philadelphia, Pa.

No Drawing. Application October 1, 1938,
Serial No. 232,853

4 Claims. (Cl. 260—464)

This invention relates to new alkoxy acetonitriles of the general formula $ROCH_2CN$ wherein R is an aliphatic hydrocarbon radical of eight or more carbon atoms. Such compounds show capillary activity which is lacking in the lower members of the series. Surface activity becomes particularly noticeable when these nitriles are converted into their water-soluble derivatives. For example, the salts of the primary amines which may be formed from these nitriles by hydrogenation give soapy, foamy solutions.

In the new compounds the R in the above formula may be a straight chain or a branched chain and either saturated or unsaturated. Typical examples are compounds in which R is a group such as n-octyl, iso-octyl, secondary octyl, nonyl, decyl, undecyl, dodecyl, tetradecyl, oleyl, cetyl, octadecyl, ceryl, montanyl or myristyl.

The compounds may be satisfactorily obtained from the corresponding chloromethyl ether by reaction with a cyanide, particularly cuprous cyanide. The chloromethyl ether and the cuprous cyanide are stirred together in a suitable apparatus. Occasionally it is necessary to warm the reaction mixture slightly to start the reaction. Since the initial reaction is usually exothermic, it is advisable to provide external cooling for the early stages of the reaction. An inert solvent, such as benzene or toluene may be used. When the initial reaction has subsided, the reaction mixture is heated at about 90-100° C. for a suitable period of time. The solids, principally cuprous chloride and cuprous cyanide, are separated by any suitable means and the alkoxy acetonitrile purified by distillation in vacuo.

The chloromethyl ethers required for this process are readily made from the corresponding alcohol, hydrogen chloride and paraformaldehyde as described in United States Patent 2,084,125 or by other similar methods.

The metallic cyanide used is advisedly in a powdered form. While silver or mercury cyanide will serve in this reaction, cuprous cyanide is preferred for reasons of cost. The cyanide may be added to the chloromethyl ether in successive additions or the chloromethyl ether may be gradually run onto the cyanide or all of the reactants may be mixed at once. The last method is convenient and feasible if cooling means are provided to control the initial stages of the reaction.

The following examples are given to illustrate the methods used for the production of the acetonitriles. Parts indicated are by weight.

EXAMPLE 1.—*Preparation of secondary octyl oxyacetonitrile*—

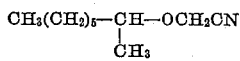

A mixture of 200 parts of powdered cuprous cyanide and 357 parts of secondary octyl chloromethyl ether was stirred in a vessel equipped with an external jacket. During the initial stage of the reaction cooling was applied. The mixture was then heated and stirred at 90-95° C. for four hours. The solid cuprous chloride and cyanide was separated by filtration. The filtrate, consisting primarily of the secondary octyl oxyacetonitrile was fractionated by vacuum distillation. A fraction of 303 parts of this compound was collected, boiling at 111-113° C./13 mm., as a colorless oil.

EXAMPLE 2.—*Preparation of 2-ethylhexoxyacetonitrile*—

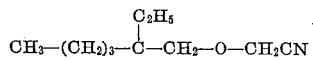

A mixture consisting of 534 parts of 2-ethylhexyl chloromethyl ether and 284 parts of cuprous cyanide was stirred and heated to 75° C. The exothermal reaction which set in carried the temperature to 110° C. After this had subsided, the mixture was heated at 95-100° C. for nine hours, then filtered, and the filtrate distilled in vacuo. The yield of 2-ethyl hexoxyacetonitrile, a colorless oil, B. P. 108-111° C./10 mm., was 443 parts.

EXAMPLE 3.—*Preparation of dodecyloxyacetonitrile*—$CH_3$—$(CH_2)_{10}$—$CH_2$—O—$CH_2CN$—A mixture consisting of 705 parts of n-dodecyl chloromethyl ether and 284 parts of cuprous cyanide was stirred and heated gently to start the reaction which was controlled so as not to exceed 110° C., by the use of a cooling bath. After the evolution of heat had ceased, the reaction mixture was stirred at 90-95° C. for twelve hours. The precipitate was washed with benzene to remove adherent oil, and the combined filtrate and washings distilled in vacuo. The product was a colorless oil, B. P. 150-155° C./5 mm. The yield was 520 parts.

EXAMPLE 4.—*Preparation of oleyloxyacetonitrile*—

$CH_3(CH_2)_7$—$CH=CH(CH_2)_7$—$CH_2$—O—$CH_2CN$

A mixture consisting of 128 parts of oleyl chloromethyl ether and 44 parts of cuprous cyanide was stirred and heated gently at 40-60° C. for one hour, then for nine hours at 90-100° C. Benzene was added, the solids filtered out, and the filtrate distilled in vacuo. 85 parts of oleyloxyacetonitrile was obtained as a colorless oil, B. P. 198-203° C./3 mm.

EXAMPLE 5.—*Preparation of cetyloxyacetonitrile*—$C_{16}H_{33}$—O—$CH_2CN$—Cetylchloromethyl ether (1735 parts) and cuprous cyanide (486 parts) were stirred together and heated at 90-95° C. for seven hours, and then at 140-150° C. for seven hours. Benzene was added, the solids removed by filtration, and the filtrate distilled in vacuo. 1186 parts of cetyloxyacetonitrile was obtained as a colorless oil boiling at 210-230° C./7 mm. (mostly at 215-220° C./7 mm.)

EXAMPLE 6.—*Preparation of iso-undecyloxyacetonitrile*—

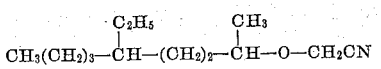

Dry hydrogen chloride was passed into a stirred, cooled mixture of 172 parts of 5-ethyl-nonanol-2, 150 parts of toluene and 33 parts of paraformaldehyde until the solution was saturated. The toluene layer was separated and freed of toluene by distillation in vacuo. The residual iso-undecyl chloromethyl ether was heated, with stirring, with 89 parts of cuprous cyanide for eight hours at 100–110° C.

The reaction mass was filtered, and the filtrate distilled in vacuo. 165 parts of iso-undecyloxyacetonitrile, a colorless oil, boiling range 118–128° C./5 mm. (mostly 122–126° C./5 mm.) was obtained.

The higher alkoxy acetonitriles are oily or unctuous in nature and boil at relatively elevated temperatures. They may be reduced to amines. Upon treatment with alkali hydroxide solutions they are converted to the alkali salts of the corresponding alkoxy-acetic acids. Controlled hydrolysis with acid yields the corresponding alkoxyacetic amide. The alkoxy acetonitriles possess marked toxic effects against insects and parasites. Since they are soluble in petroleum products, they may be useful in fly sprays. They may also be used in the processing of textiles, leather and lubricants.

We claim:

1. As a new compound, an alkoxy acetonitrile of the formula R—O—CH$_2$CN wherein R is an aliphatic hydrocarbon group of at least eight carbon atoms.
2. Secondary octyloxyacetonitrile.
3. Dodecyloxyacetonitrile.
4. Cetyloxyacetonitrile.

HERMAN A. BRUSON.
RUSH F. McCLEARY.